(12) United States Patent
Stevens et al.

(10) Patent No.: US 9,544,022 B2
(45) Date of Patent: *Jan. 10, 2017

(54) CONTROLLING INDUCTIVE POWER TRANSFER SYSTEMS

(71) Applicant: Access Business Group International LLC, Ada, MI (US)

(72) Inventors: Michael Craig Stevens, Cambridge (GB); Alexander Charles Knill, Devon (GB); John Robert Dunton, Suffolk (GB)

(73) Assignee: Access Business Group International LLC, Ada, MI (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/082,979

(22) Filed: Nov. 18, 2013

(65) Prior Publication Data
US 2014/0077615 A1    Mar. 20, 2014

Related U.S. Application Data

(60) Continuation of application No. 13/196,298, filed on Aug. 2, 2011, now Pat. No. 8,610,400, which is a
(Continued)

(30) Foreign Application Priority Data

May 11, 2004    (GB) .................................. 0410503.7

(51) Int. Cl.
*H04B 5/00*    (2006.01)
*H02J 5/00*    (2016.01)
(Continued)

(52) U.S. Cl.
CPC ............. *H04B 5/0037* (2013.01); *H02J 5/005* (2013.01); *H02J 7/025* (2013.01); *H02J 17/00* (2013.01); *Y10T 307/297* (2015.04)

(58) Field of Classification Search
CPC ...................................................... H02J 7/025
(Continued)

(56) References Cited

U.S. PATENT DOCUMENTS 3,938,018 A    2/1976  Dahl
4,218,648 A    8/1980  Sansum
(Continued)

FOREIGN PATENT DOCUMENTS

DE    197 41 279    9/1997
EP    0 533 247    3/1993
(Continued)

OTHER PUBLICATIONS

Search Report issued in PCT International Application No. PCT/GB2005/001824 dated Nov. 23, 2006.
(Continued)

*Primary Examiner* — Robert Deberadinis
(74) *Attorney, Agent, or Firm* — Warner Norcross & Judd LLP

(57)    ABSTRACT

An inductive power transfer system comprises a primary unit, having a primary coil and an electrical drive unit which applies electrical drive signals to the primary coil so as to generate an electromagnetic field. The system also comprises at least one secondary device, separable from the primary unit and having a secondary coil which couples with the field when the secondary device is in proximity to the primary unit. A control unit causes a circuit including said primary coil to operate, during a measurement period, in an undriven resonating condition. In this condition the application of the drive signals to the primary coil by the electrical drive unit is suspended so that energy stored in the circuit decays over the course of the period. A decay
(Continued)

measurement unit takes one or more measures of such energy decay during the measurement period. In dependence upon said one or more energy decay measures, the control unit controls the electrical drive unit so as to restrict or stop inductive power transfer from the primary unit.

22 Claims, 6 Drawing Sheets

Related U.S. Application Data continuation of application No. 12/885,445, filed on Sep. 18, 2010, now Pat. No. 8,035,340, which is a continuation of application No. 12/366,842, filed on Feb. 6, 2009, now Pat. No. 7,868,587, which is a division of application No. 11/569,029, filed as application No. PCT/GB2005/001833 on May 11, 2005, now Pat. No. 7,554,316.

(51) Int. Cl.
  *H02J 7/02*    (2016.01)
  *H02J 17/00*   (2006.01)

(58) Field of Classification Search
  USPC .......................................................... 307/104
  See application file for complete search history.

(56) References Cited

U.S. PATENT DOCUMENTS

| | | | |
|---|---|---|---|
| 4,654,573 A | 3/1987 | Rough et al. |
| 4,942,352 A | 7/1990 | Sano |
| 5,070,293 A | 12/1991 | Ishii et al. |
| 5,216,402 A | 6/1993 | Carosa |
| 5,323,099 A | 6/1994 | Bruni et al. |
| 5,367,242 A | 11/1994 | Hulman |
| 5,455,466 A | 10/1995 | Parks et al. |
| 5,536,979 A | 7/1996 | McEachern et al. |
| 5,550,452 A | 8/1996 | Shirai et al. |
| 5,619,078 A | 4/1997 | Boys et al. |
| 5,686,812 A | 11/1997 | Hotta |
| 5,726,573 A | 3/1998 | Chen et al. |
| 5,734,254 A | 3/1998 | Stephens |
| 5,793,624 A | 8/1998 | Couture et al. |
| 5,821,728 A | 10/1998 | Schwind |
| 5,896,278 A | 4/1999 | Tamura et al. |
| 5,949,155 A | 9/1999 | Tamura et al. |
| 5,952,814 A | 9/1999 | Van Lerberghe |
| 5,991,170 A | 11/1999 | Nagai et al. |
| 6,028,413 A | 2/2000 | Brockmann |
| 6,040,986 A | 3/2000 | Sakamoto et al. |
| 6,057,668 A | 5/2000 | Chao |
| 6,118,249 A | 9/2000 | Brockmann et al. |
| 6,184,651 B1 | 2/2001 | Fernandez et al. |
| 6,208,115 B1 | 3/2001 | Binder |
| 6,263,247 B1 | 7/2001 | Mueller et al. |
| 6,301,128 B1 | 10/2001 | Jang et al. |
| 6,345,203 B1 | 2/2002 | Mueller et al. |
| 6,364,735 B1 | 4/2002 | Bristow et al. |
| 6,459,218 B2 | 10/2002 | Boys et al. |
| 6,721,540 B1 | 4/2004 | Hayakawa |
| 6,750,560 B1 | 6/2004 | Nishimoto et al. |
| 7,049,885 B2 | 5/2006 | Ishizaki |
| 8,610,400 B2 * | 12/2013 | Stevens ............... H02J 5/005 307/104 |
| 2002/0154518 A1 | 10/2002 | Elferich et al. |
| 2002/0158512 A1 | 10/2002 | Mizutani et al. |
| 2003/0080824 A1 | 5/2003 | Tanaka et al. |
| 2003/0227364 A1 | 12/2003 | Li et al. |
| 2004/0067411 A1 | 4/2004 | Lisanke |
| 2004/0130916 A1 | 7/2004 | Baarman |
| 2004/0145342 A1 | 7/2004 | Lyon |
| 2005/0007067 A1 | 1/2005 | Baarman et al. |
| 2005/0068019 A1 | 3/2005 | Nakamura et al. |
| 2007/0228833 A1 | 10/2007 | Stevens et al. |
| 2009/0012655 A1 | 1/2009 | Kienman et al. |

FOREIGN PATENT DOCUMENTS

| | | |
|---|---|---|
| EP | 0 903 830 | 3/1999 |
| EP | 0 905 856 | 3/1999 |
| EP | 1 022 840 | 7/2000 |
| EP | 2 017 940 | 1/2009 |
| FR | 2 767 767 | 3/1999 |
| GB | 2 388 716 | 11/2003 |
| GB | 2 389 720 | 12/2003 |
| JP | 09-103037 | 4/1997 |
| JP | H10-215530 | 8/1998 |
| JP | 2000-295796 | 10/2000 |
| JP | 2001-275282 | 9/2003 |
| JP | 2003-264934 | 9/2003 |
| WO | 02/37641 | 5/2002 |
| WO | 2004/015885 | 2/2004 |
| WO | 2005/031944 | 4/2005 |
| WO | 2009/081115 | 7/2009 |

OTHER PUBLICATIONS

Response to European Office Action in counterpart European patent application dated Nov. 14, 2007.
Written Opinion of the International Searching Authority for PCT/GB2005/001833.

* cited by examiner

CONTROLLING INDUCTIVE POWER TRANSFER SYSTEMS

The present invention relates to controlling inductive power transfer systems for use, for example, to power portable electrical or electronic devices.

Inductive power transfer systems suitable for powering portable devices may consist of two parts:

A primary unit having at least one primary coil, through which it drives an alternating current, creating a time-varying magnetic flux.

A secondary device, separable from the primary unit, containing a secondary coil. When the secondary coil is placed in proximity to the time-varying flux created by the primary coil, the varying flux induces an alternating current in the secondary coil, and thus power may be transferred inductively from the primary unit to the secondary device.

Generally, the secondary device supplies the transferred power to an external load, and the secondary device may be carried in or by a host object which includes the load. For example the host object may be a portable electrical or electronic device having a rechargeable battery or cell. In this case the load may be a battery charger circuit for charging the battery or cell. Alternatively, the secondary device may be incorporated in such a rechargeable cell or battery, together with a suitable battery charger circuit.

A class of such an inductive power transfer systems is described in our United Kingdom patent publication GB-A-2388716. A notable characteristic of this class of systems is the physically "open" nature of the magnetic system of the primary unit—a significant part of the magnetic path is through air. This is necessary in order that the primary unit can supply power to different shapes and sizes of secondary device, and to multiple secondary devices simultaneously. Another example of such an "open" system is described in GB-A-2389720.

Such systems may suffer from some problems. A first problem is that the primary unit cannot be 100% efficient. For example, switching losses in the electronics and $I^2R$ losses in the primary coil dissipate power even when there is no secondary device present, or when no secondary devices that are present require charge. This wastes energy. Preferably the primary unit should enter a low-power "standby mode" in this situation.

A second problem in such systems is that it is not possible to mechanically prevent foreign objects from being placed into proximity with the primary coil, coupling to the coil. Foreign objects made of metal will have eddy-currents induced therein. These eddy currents tend to act to exclude the flux, but because the material has resistance, the flowing eddy currents will suffer $I^2R$ losses which will cause heating of the object. There are two particular cases where this heating may be significant:

If the resistance of any metal is high, for example if it is impure or thin.

If the material is ferromagnetic, for example steel. Such materials have high permeability, encouraging a high flux density within the material, causing large eddy currents and therefore large $I^2R$ losses.

In the present application, such foreign objects that cause power drain are termed "parasitic loads". Preferably the primary unit should enter a "shutdown mode" when parasitic loads are present, to avoid heating them.

Various approaches to solve these two problems have been proposed in the prior art.

Solutions to the first problem, of not wasting power when no secondary device requires charge, include:

In EP0533247 and U.S. Pat. No. 6,118,249 the secondary device modulates its inductive load during charging, causing a corresponding variation in the power taken from the primary unit. This indicates to the primary unit that it should stay out of the standby state.

In EP1022840 the primary unit varies the frequency of its drive, and thus the coupling factor to a tuned secondary unit. If the secondary unit is not taking power, there is no difference in the power taken as the frequency is swept and thus the primary unit goes into a standby state.

In U.S. Pat. No. 5,536,979 the primary unit simply measures the power flowing in the primary coil, and enters a pulsing standby state if this is below a threshold.

In U.S. Pat. No. 5,896,278 the primary unit contains detecting coils which have power coupled back into them according to the position of the secondary device. If the device is not present the primary unit enters a standby mode.

In U.S. Pat. No. 5,952,814 the secondary device has a mechanical protrusion which fits a slot in the primary unit, activating it.

In U.S. Pat. No. 6,028,413 the primary unit drives two coils, and there are a corresponding two power receiving secondary coils in the secondary unit. The primary unit measures the power delivered from each primary coil and enters standby mode if it is below a threshold.

Solutions to the second problem, of parasitic loads, include:

As mentioned above, in EP1022840 the primary unit varies the frequency of its drive. In this system, the secondary device is tuned, so this frequency variation will result in a variation of the power taken from the primary unit. If the load is instead a piece of metal, then varying the frequency will not have as much effect and the primary unit will enter a shutdown state.

As mentioned above, in U.S. Pat. No. 5,952,814 a key in the secondary device activates the primary unit. The assumption is that if a secondary device is present then this will physically exclude any foreign objects.

As mentioned above, in U.S. Pat. No. 6,028,413 the primary unit supplies power to the secondary device by driving two primary coils. If the amount of power supplied by the two coils is different, the primary unit assumes that the load is not a valid secondary device and enters shutdown mode.

These approaches all assume a 1:1 relationship between the primary unit and the secondary device. Therefore they are not sufficient for systems such as those described in GB-A-2388716 where more than one secondary device at a time may be present. For example, they would not work when there are two secondary devices present, one requiring charge and the other not.

Some of these approaches also assume that the physical or electrical presence of a valid secondary device implies that all foreign objects are physically excluded by the secondary device. This is not necessarily the case, particularly when the secondary devices may be positioned arbitrarily in respect of the primary unit, as in those described in GB-A-2388716.

According to a first aspect of the present invention, there is provided an inductive power transfer system comprising a primary unit, having a primary coil and electrical drive means connected to the primary coil for applying electrical drive signals thereto so as to generate an electromagnetic field, and the system also comprising at least one secondary device, separable from the primary unit and having a secondary coil adapted to couple with said field when the secondary device is in proximity to the primary unit so that power can be transferred inductively from the primary unit to the secondary device without direct electrical conductive contacts therebetween, wherein the primary unit further comprises: control means operable to cause a circuit including said primary coil to operate, during a measurement period, in an undriven resonating condition in which the application of said drive signals to said primary coil by said electrical drive means is suspended so that energy stored in said circuit decays over a course of said period; and decay measurement means operable to take one or more measures of such energy decay during said period; said control means being further operable, in dependence upon said one or more energy decay measures, to control the electrical drive means so as to restrict or stop inductive power transfer from the primary unit.

Such a system is advantageous because it can address either or both the standby problem and the parasitic load detection problem listed above, in a robust and cost-effective manner, and is particularly advantageous in systems which may have multiple secondary devices present in different charge states, and/or whose open magnetic nature makes it easy for parasitic objects to couple to the primary coil.

In the present application, the term "ring-down" will be used to mean causing the circuit ("resonant tank") including the primary coil to operate in this undriven resonating condition.

During a ring-down, no energy is being supplied to the primary coil, and so the decay of energy in the resonant tank is a measure of how much energy is being removed from it. The principal causes of energy loss are:

Energy coupled into the secondary coil of any secondary device present. This energy may be stored in a storage unit of the secondary device (if provided) and/or delivered to a load connected to the secondary device.

Losses to any parasitic loads (foreign objects other than valid secondary devices) present.

Other losses in the primary unit or any secondary devices/host objects present. These other losses include inefficiencies in the primary coil itself and any other components of the resonant tank (e.g. $I^2R$ losses in the copper of the coil or effective series resistance of any resonating capacitor). They also include any magnetic losses in the primary and secondary units, for example magnetic hysteretic loop losses in any cores associated with the primary unit and/or secondary device.

In a preferred embodiment the or one energy decay measure is a measure of a rate of such energy decay. In this case, the rate of energy decay is a measure of the rate at which energy is being removed from the resonant tank.

The control means may employ the energy decay measures to detect when a substantial parasitic load is present in proximity to said primary unit, and restrict or stop inductive power transfer from the primary unit following the detection of such a substantial parasitic load. For example, the energy decay rate may be compared with a shutdown threshold, and if the rate exceeds the threshold the power transfer is shut down.

Alternatively, or in addition, the control means may employ the energy decay measures to detect when there is no secondary device present in proximity to the primary unit, and restrict or stop inductive power transfer from the primary unit when no such secondary device is detected.

When carrying out such detection the control means may employ first compensation information relating to a load imposed on the primary unit by losses in the primary unit itself so as to compensate for said losses of said primary unit. This prevents the detection from being affected by the inefficiencies in the primary coil itself and any other components of the resonant tank, as mentioned above.

The primary unit may further comprise calibration means for deriving part or all of the first compensation information from measurements taken by the primary unit when it is effectively in electromagnetic isolation.

As noted above, depending on its construction, the secondary device, and/or any host object which carries it, may suffer magnetic losses intrinsic to its construction, for example in magnetic core material, and other metal used in its construction. These so-called "friendly parasitics" will be accounted for by the primary unit as a further parasitic loss, and if they sum to more than the threshold, the control means will shut the primary unit down. This may be avoided by providing a method of communicating the friendly parasitics of a device to the primary unit so that they may be accounted for and added to the shutdown threshold.

Accordingly, when carrying out such detection said control means may employ second compensation information relating to a parasitic load imposed on the primary unit by the secondary device so as to compensate for the parasitic load of the secondary device.

In this case, preferably the or each secondary device is operable to communicate its second compensation information directly to the primary unit or to communicate to the primary unit other information from which the primary unit can derive the second compensation information.

The secondary device may modulate a dummy load to communicate this other information, and the primary unit may derive the second compensation information by measuring the dummy load modulation.

This way of communicating the second compensation information also still works if multiple secondary devices are present. For example, assuming the secondary devices apply their dummy loads at the same time, the primary unit will see a total dummy load equal to the sum of the individual dummy loads of the secondary devices. This is all that the primary unit needs to know for compensating for the parasitic loads of the secondary devices.

One way of doing this is to have a feedback resistor, whose value is proportional to the value of the friendly parasitics of the secondary device, which can be switched across the secondary coil, creating a dummy parasitic load. If this feedback resistor is always applied during certain ring-downs (for example during the third ring-down of a set), the primary unit can then measure the sum of the incremental loads resulting from the feedback resistors in each secondary device present (whether its load is drawing power or not) and adjust its threshold accordingly. As described below, the same feedback resistor may be used as a binary on/off signalling means to control standby mode.

Part or all of the first compensation information and/or part or all of the second compensation information may be information stored in the primary unit during manufacture and/or testing of the primary unit.

The system may have information varying means for varying one or both of the first and second compensation information when one or more operating conditions (for example, temperature) of the primary unit vary.

The decay measurement means may take one or more first such energy decay measures in a first such measurement period and take one or more second such energy decay measures in a second measurement period. In this case the secondary device may comprise decay varying means which cause the secondary device to consume more energy in the first measurement period than in the second measurement period. The control means in said primary unit can then employ the first and second energy decay measures to detect when a secondary device of the system is present in proximity to the primary unit. For example, if the control means detects a substantial difference between the first energy measures and the second energy measures, it may conclude that a secondary device must be present.

The decay varying means may cause the secondary device to impose a first dummy load on the primary unit in the first measurement period and to impose a second dummy load, different from the first dummy load, on said primary unit in the second measurement period. One of the first and second dummy loads may be zero.

In this way, the secondary device may apply an additional dummy (or "feedback") load only during some ring-downs and not during others, or only during some part of the ring-down but not others. This may be done for example by switching the feedback resistor mentioned above across the secondary coil, creating a dummy parasitic load, as measured by the primary unit, which varies with time. In contrast, true parasitic loads (for example a piece of steel) will appear to be a constant parasitic load. If the primary unit control means takes similar load measurements between different ring-downs, or different parts of the same ring-down, it may put the drive means into a power-saving "standby" mode. This mode will be entered when no valid secondary device is present.

The decay varying means may be disabled when an actual load of the secondary device requires no power. If the secondary device only presents a time-varying load during ring-down when it requires power, then the primary unit will enter a standby mode even when there are secondary devices present, if they don't require power.

A difference between the first dummy load and the second dummy load may be set in dependence upon said parasitic load imposed on said primary unit by said secondary device. This is a convenient way to communicate the second compensation information to the primary unit.

The secondary device may be adapted to supply the power it receives inductively from the primary unit to an actual load external to the secondary device. The load may be physically separable from the rest of the secondary device, for example it may be connected by a removable plug and socket arrangement. Of course, the secondary device will generally include its own circuitry which will need some of the received power too. In some cases the load could be internal to the secondary device.

The secondary device preferably comprises a storage means for storing energy received from the primary unit. The storage means, where provided, supplies stored energy to the actual load and/or circuitry of the secondary device when the circuit is operating in the undriven resonating condition. This is not essential in all embodiments. Any load which can cope with short power reductions or interruptions will not require the storage means.

The secondary device may comprise load isolation means operable during the measurement period to prevent the supply to an actual load of the secondary device of any of the power being received inductively by the secondary device from the primary unit. Ideally during a ring-down the storage means of the secondary device is of sufficient capacity, and sufficiently well-charged before the ring-down commences, that the decay of energy in the storage means happens more slowly than the decay of energy in the primary coil. If this cannot be guaranteed to be the case under all conditions, for example if the load is separable and with unknown characteristics, then the load isolation means can be included in the secondary device to disconnect the secondary device's storage means, and load, during the ring down, to ensure that its electrical load is not measured by the primary unit.

When the inductive power transfer from the primary unit has been set to such a restricted or stopped state, for example because the parasitic load became too high, the control means may cause the circuit to operate in the undriven resonating condition during a series of intermittent probing periods. In this case the decay measurement means takes one or more such energy decay measures during each said probing period. The control means employ the energy decay measures taken during the probing periods to determine when to end the restricted or stopped state. For example, the control means may periodically allow the drive to run for a short while in order to conduct a ring-down to measure the parasitic load and, if it is now below a threshold, resume the drive.

Alternatively, when the inductive power transfer from the primary unit has been set into such a restricted or stopped state, the control means may maintain that state until the primary unit is reset by a user of the primary unit.

It may be advantageous to provide a clear means of synchronising the behaviour of the secondary device with that of the primary unit. For example, if the secondary device must isolate the load during ring-down, it may need a clear signal that such a ring-down is about to happen, since opening it once a ring-down is in process may be too late. There are many possible means of such synchronisation using a variety of communications means, but one convenient and reliable method is to use the power transfer channel between primary unit and secondary device by putting onto the primary coil a signal which does not occur during normal operation. For example, the primary unit may change the amplitude, frequency or phase of its drive.

The primary unit may comprise synchronising means operable to transmit a predetermined synchronising signal to the secondary device to synchronise operation of the secondary device with that of the primary unit.

The synchronising means may send the predetermined synchronising signal prior to causing the circuit to operate in said undriven resonating condition.

The primary unit may further comprise snubber means. In this case, the synchronising means may switch the snubber means into the circuit after suspending the application of electrical drive signals to said primary coil, so as to send the synchronising signal to the secondary device. In this way the primary coil is stopped very quickly by switching in the snubber, which provides a very easily detectable synchronising signal.

The storage means (e.g. capacitor) of the secondary device may be of significant size and cost if it is to provide sufficient capacity to supply the load during a ring-down. Therefore it is advantageous for the ring-down to occur as quickly as possible. Measuring fewer cycles of the primary coil is one way to achieve this. This will reduce the accuracy of the system but this may be compensated for by averaging the results of several ring-downs.

The primary unit may further comprise resonant frequency increasing means for temporarily increasing a resonant frequency of the circuit during operation thereof in the undriven resonating condition. This is another way to shorten the ring-down time, because by increasing the resonant frequency of the primary coil during a ring-down, more cycles occur in less time.

The control means preferably cause the electrical drive means to resume application of the drive signals to the primary coil in phase with any residual resonating energy within the circuit. After a ring-down is complete, the primary unit must resume normal operation as quickly as possible to prevent the secondary device storage means from discharging to the point where the supply to the load becomes inadequate. Restarting the drive to the primary coil in-phase with any residual resonating energy within the primary coil can ensure that the coil returns to nominal operating conditions as quickly as possible.

The control means may cause the electrical drive means to temporarily boost the electrical drive signals prior to causing the circuit to operate in the undriven resonating condition. This can enhance the hold-up of the secondary device storage means, for any given such means, keeping the size and cost of such means to a minimum. Before a ring-down, the control means may cause a boost in the current in the primary coil for one or more cycles, thus temporarily raising the voltage in the secondary device storage means. This stores more energy in that means, enabling it to power the load for longer during ring-down.

The control means may measure a natural resonant frequency of the circuit during the measurement period and employ the measured frequency to compensate for an influence of changes in the natural resonant frequency on the energy decay measures. Because the resonant tank is not being actively driven during ring-down, the primary coil resonates at the natural resonant frequency of the system. Measuring the natural resonant frequency during ring-down allows a calculation of the inductance to be made, leading to a direct calculation of total power loss. The inductance may change due to the presence of secondary devices and/or parasitic loads.

The control means may cause the circuit to operate in the undriven resonating condition during a series of different such measurement periods. In this case, the decay measurement means may take one or more such energy decay measures in each said measurement period. The control means can then employ the energy decay measures taken in two or more different measurement periods to control said electrical drive means. For example, the control means can employ an average of the energy decay measures taken in different measurement periods.

Two or more successive measurement periods may be part of the same ring-down. This can give fast results. Alternatively, there may be just one measurement period in each ring-down. This gives slower results but it is possible to resume application of drive signals to the primary coil between measurement periods, making the power interruption to the secondary devices shorter. Also, the circuit conditions can be replicated at the start of each measurement period. The duration of each ring-down is preferably short compared to an interval between successive ring-downs.

In some systems, the primary coil may not driven continuously. It may, for example, be driven in pulses, for example in a pulse-width-modulated manner. In such systems, a partial "ring-down" is effectively happening whenever the primary coil is not being actively driven, perhaps once or more per cycle. Measurement of the natural resonant frequency and decay of the primary coil during these undriven periods can provide the same functionality as that from the multiple-cycle ring-downs described above.

The secondary device may have a timing means capable of changing the behaviour of the secondary device over time. For example, the timing means may detect when a second ring-down has happened shortly after a first ring-down, and, for example, switch in a conditional dummy (feedback) load only on such a shortly-following second ring-down. This may be useful for example in making interactions between the primary unit and secondary device more deterministic. For example such a means could be used to make the standby detection scheme described above more reliable. For example, if the primary unit always conducts ring-downs in pairs a few milliseconds apart but repeated once every second, and the secondary device applies the feedback load only on the second of the two ring-downs of a pair, the primary unit may average several "first ring downs", and separately average several "second ring-downs", to improve the accuracy of measurement.

The invention can operate even in systems which have more than one primary coil. An example is systems which allow complete freedom of position or orientation of the secondary device by having two orthogonal coils, driven in quadrature, as in GB-A-2388716. In such systems there will be some coupling between the two primary coils, which may make it awkward to analyse a "ring-down" occurring simultaneously on both coils. In this case, the coils can be tested alternately. At the start of a test, both coils are halted, but then only the first coil is allowed to ring-down while the second coil is held in a halted state to prevent it from affecting the measurements on the first coil. During the next test the first coil is held halted while the second coil is allowed to ring-down.

Accordingly, in a preferred embodiment the primary unit may have first and second such primary coils. A first such electrical drive means is connected to the first primary coil for applying electrical drive signals thereto so as to generate a first electromagnetic field, and a second such electrical drive means is connected to the second primary coil for applying electrical drive signals thereto so as to generate a second electromagnetic field. The control means causes the second electrical drive means to suspend application of electrical drive signals to the second primary coil whilst a first such circuit including the first primary coil is in the undriven resonating condition and the decay measurement means are taking one or more such measures of energy decay in the first circuit. Similarly the control means causes the first electrical drive means to suspend application of electrical drive signals to the first primary coil whilst a second such circuit including said second primary coil is in the undriven resonating condition and the decay measurement means are taking one or more such measures of energy decay in the second circuit.

The operating conditions of the primary unit after the ring-down is complete are likely to be identical to those before the ring-down started. If the primary unit contains any control loops (for example to maintain the strength of the magnetic flux), these control loops may be frozen during the ring-down, so that they do not respond to the ring-down and can resume normal operation immediately.

At least one secondary device may be carried in or by an object requiring power. The secondary device can receive power inductively from the primary unit when the object carrying the secondary device is placed on or in proximity to the primary unit. The object may be a portable electrical or electronic device, for example a mobile communication device.

The system may have an "open" construction with a power transfer surface, the field generated by said primary unit being distributed over a power transfer area of the surface such that, when such a secondary device is placed on or in proximity to the power transfer area, the device can receive power inductively from the primary unit.

The power transfer area may be large enough that two or more such secondary devices can be placed on or in proximity to the power transfer area to receive power simultaneously from the primary unit.

According to a second aspect of the present invention there is provided a primary unit, for use in an inductive power transfer system, the primary unit comprising: a primary coil; electrical drive means connected to said primary coil for applying electrical drive signals thereto so as to generate an electromagnetic field; control means operable to cause a circuit including said primary coil to operate, during a measurement period, in an undriven resonating condition in which the application of said drive signals to said primary coil by said electrical drive means is suspended so that energy stored in said circuit decays over the course of said period; and decay measurement means operable to take one or more measures of such energy decay during said period; said control means being further operable, in dependence upon said one or more energy decay measures, to control the electrical drive means so as to restrict or stop inductive power transfer from the primary unit.

According to a third aspect of the present invention there is provided a secondary device, for use in an inductive power transfer system that comprises a primary unit which generates an electromagnetic field, the secondary device comprising: a secondary coil adapted to couple with said field generated by said primary unit when the secondary device is in proximity to the primary unit so that power can be received inductively by the secondary device from the primary unit without direct electrical conductive contacts therebetween; load connection means, connected to said secondary coil and adapted to be connected when the secondary device is in use to a load requiring power from the primary unit, for supplying such inductively-received power to the load; and communication means operable to communicate to the primary unit information relating to a parasitic load imposed on the primary unit by the secondary device.

The communication means may communicate the information by imposing a dummy load on said primary unit.

The communication means may impose a first dummy load on the primary unit at a first time and a second dummy load, different from the first dummy load, at a second time, a difference between the first and second dummy loads being set in dependence upon the parasitic load. One of the first and second dummy loads may be zero.

This way of communicating the information still works if multiple secondary devices are present. For example, assuming the secondary devices apply their dummy loads at the same time, the primary unit will see a total load equal to the sum of the individual dummy loads of the secondary devices. In this way, the total parasitic load from multiple secondary devices can be communicated very efficiently and reliably.

Alternatively, the communication means may set a time period in which a dummy load is imposed on the primary unit in dependence upon the parasitic load imposed on the primary unit by the secondary device. The primary unit can then measure the duration of the period to obtain information relating to the parasitic load.

According to a fourth aspect of the present invention there is provided a portable electrical or electronic device comprising: a load which at least at times requires power from said primary unit; and a secondary device embodying the aforesaid third aspect of the present invention, said load connection means of said secondary device being connected to said load for supplying such inductively-received power to the load at said times.

According to a fifth aspect of the present invention there is provided a method of controlling inductive power transfer in an inductive power transfer system comprising a primary unit, having a primary coil to which electrical drive signals are applied to generate an electromagnetic field, and also comprising at least one secondary device, separable from the primary unit and having a secondary coil adapted to couple with said field when the secondary device is in proximity to the primary unit so that power can be transferred inductively from the primary unit to the secondary device without direct electrical conductive contacts therebetween, which method comprises: causing a circuit including said primary coil to operate, during a measurement period, in an undriven resonating condition in which the application of said drive signals to said primary coil is suspended so that energy stored in the circuit decays over the course of said period; taking one or more measures of such energy decay during said period; and restricting or stopping inductive power transfer from the primary unit in dependence upon said one or more energy decay measures.

Reference will now be made, by way of example, to the accompanying drawings in which:

FIG. 1 is a block diagram showing parts of an inductive power transfer system embodying the present invention;

FIGS. 2(A) and (B) show example waveforms generated in the FIG. 1 system;

Figure 1:
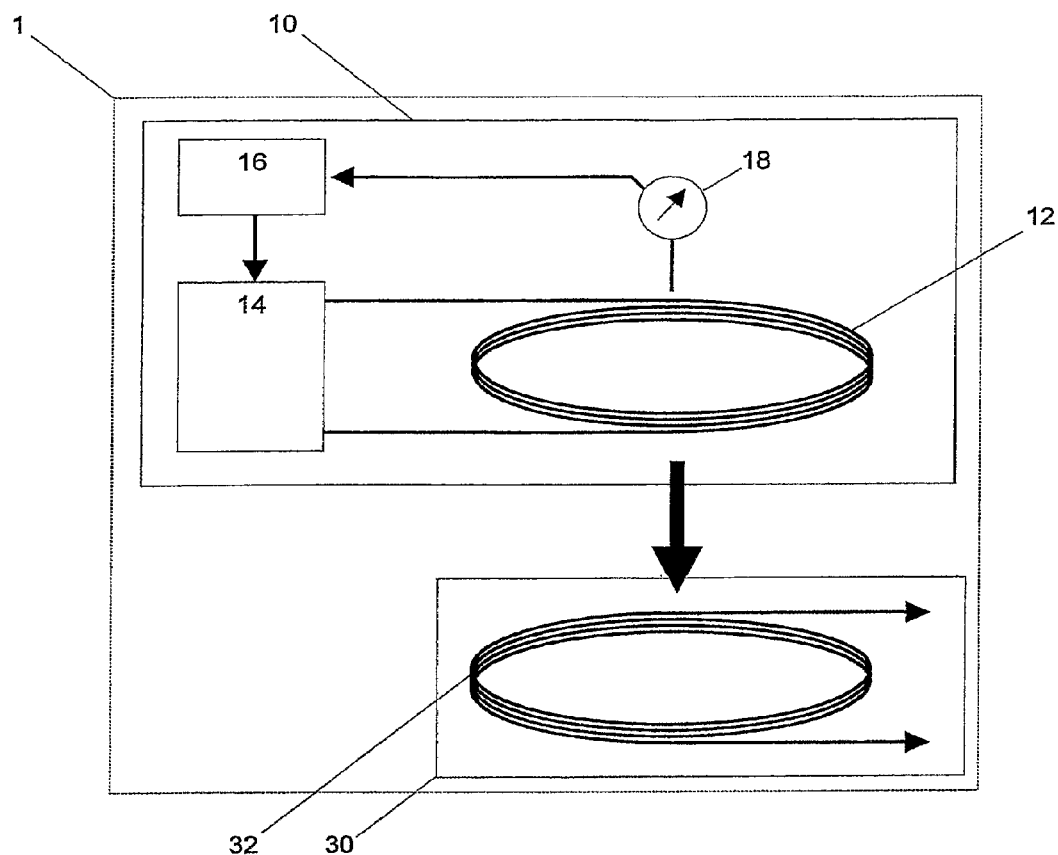

FIG. 1 illustrates parts of an inductive power transfer system embodying the present invention. The system 1 comprises a primary unit 10 and at least one secondary device 30. The primary unit 10 has a primary coil 12 and an electrical drive unit 14 connected to the primary coil 12 for applying electrical drive signals thereto so as to generate an electromagnetic field.

The primary unit may have any suitable form but one preferred form is a flat platform having a power transfer surface on or in proximity to which each secondary device can be placed. In this case, the field may be distributed over a power transfer area of the surface, as described in GB-A-2388716.

The secondary device 30 is separable from the primary unit 10 and has a secondary coil 32 which couples with the electromagnetic field generated by the primary unit when the secondary device is in proximity to the primary unit. In this way, power can be transferred inductively from the primary unit to the secondary device without direct electrical conductive contacts therebetween.

The primary and secondary coils can have any suitable forms, but may for example be copper wire wound around a high-permeability former such as ferrite or amorphous metal.

The secondary device is usually connected to an external load (not shown) and supplies the inductively-received power to the external load. The secondary device may be carried in or by an object requiring power such as a portable electrical or electronic device or a rechargeable battery or cell. Further information regarding designs of secondary device and the objects which can be powered using the secondary devices can be found in GB-A-2388716.

The primary unit 10 in the FIG. 1 system also comprises a control unit 16 and a decay measurement unit 18. The control unit causes a circuit (referred to hereinafter as a "resonant tank") including the primary coil to operate in an undriven resonating condition during a measurement period. In this undriven resonating condition ("ring-down") the application of electrical drive signals to the primary coil by the electrical drive unit 14 is suspended so that energy stored in the resonant tank decays over the course of the measurement period.

Typically a resonant tank is formed by a circuit comprising at least an inductor and a capacitor. The resonant tank stores electrical energy. When brought into the undriven resonating condition, the stored electrical energy flows or oscillates within the tank at a natural resonant frequency of the tank.

The resonant tank includes not only the electrical circuit within the primary unit of which the primary coil is a part, but also the electrical circuit(s) within the at least one secondary units, which is or are coupled to the primary coil via the magnetic circuit formed by the primary and secondary coil(s).

The primary coil may be made resonant with a capacitor in series or parallel, or both series and parallel, and/or may be resonant due to its self-capacitance. It may or may not be driven at its resonant frequency in normal operation, but once a ring-down occurs will naturally oscillate at its resonant frequency.

During a ring-down, no energy is being supplied to the primary coil, and so the rate of decay of energy in the resonant tank is a measure of the rate at which energy is being removed from it. The principal causes of energy loss are:

Energy coupled into the secondary coil of any secondary device present. This energy may be stored in a storage unit of the secondary device and/or delivered to a load connected to the secondary device.

Losses to any parasitic loads (foreign objects) present.

Other losses in the primary unit or any secondary devices/host objects present. These other losses include inefficiencies in the primary coil itself and any other components of the resonant tank (e.g. $I^2R$ losses in the copper of the coil or effective series resistance of any resonating capacitor). They also include any magnetic losses in the primary and secondary units, for example magnetic hysteretic loop losses in any cores associated with the primary unit and/or secondary device.

Figure 2A:
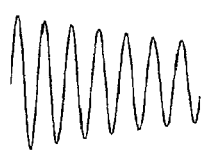
Figure 2B:

FIGS. 2(A) and 2(B) show two possible examples of energy decay during a ring-down. If the losses are small (FIG. 2(A)) then during a ring-down the energy in the resonant tank will decay slowly. Conversely if the losses are large (FIG. 2(B)) then during a ring-down the energy in the resonant tank will decay rapidly.

The decay measurement unit 18 takes one or more measures of the energy decay in the resonant tank during the measurement period.

The decay measurement unit 18 may take the energy decay measures in any suitable way, for example by measuring the voltage across, or current through, the primary coil or by measuring some other quantity associated with the primary coil, for example the magnetic flux generated thereby. The measurement may be taken over part of a cycle, or over one or more cycles. The measure may be, for example, the ratio of one peak to a subsequent peak. Alternatively, the measure may be derived by curve-fitting several data points. The measure is a rate of energy decay in the resonant tank in one preferred embodiment.

The control unit 16 controls the electrical drive unit 14 so as to restrict or stop inductive power transfer from the primary unit in dependence upon the energy decay measures produced by the decay measurement unit 18.

The energy decay measures may be used by the control unit to restrict or stop inductive power transfer from the primary unit following the detection of certain conditions.

One such condition is the presence of a substantial parasitic load in the vicinity of the primary unit. In this case, the control unit 16 may enter a shutdown mode in which the drive to the primary coil is reduced or stopped, preventing heating of the parasitic load.

Another such condition is when no secondary device of the system is present in the vicinity of the primary unit. Another such condition is when there is at least one secondary device present but none of the devices has a load currently requiring power. A load does not require power, for example, when turned off or when, in the case of a rechargeable battery or cell, the battery or cell is fully charged. Under both these conditions the control unit 16 may enter a standby mode in which the drive to the primary coil is reduced or stopped, preventing unnecessary power consumption in the primary unit.

Compared to other possible methods of measuring the power delivered to the primary coil—for example by measuring the supply power to the primary unit drive electronics—the method used in the present invention is quick and accurate. This accuracy is due at least to the following aspects:

The drive electronics may be inactive and largely out of circuit during the ring-down, therefore their noise and tolerances do not affect the measurement accuracy.

Since the method directly measures power taken, it is very hard to "trick"—it works reliably regardless of how power is being taken out, in contrast to other indirect techniques such as measuring inductance shift which make assumptions between the quality they measure and the parasitic load, which may not always be true.

Figure 4:
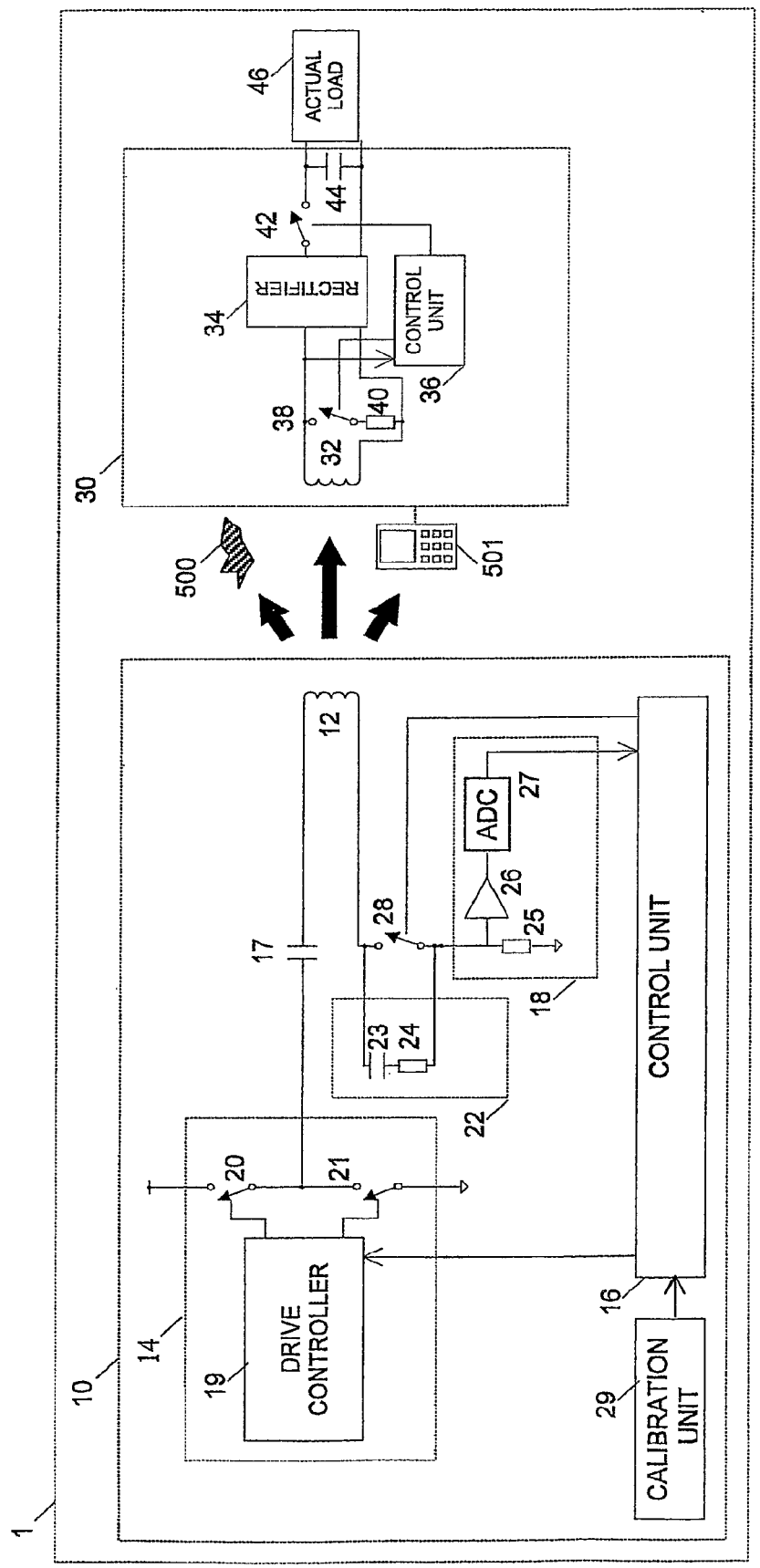
FIG. 4 is a block diagram showing parts of an inductive power transfer system according to a preferred embodiment of the present invention.

FIG. 4 shows parts of an inductive power transfer system according to a preferred embodiment of the present invention. The system 1 has a primary unit 10 and a secondary device 30. FIG. 4 also shows a parasitic load 500 on the primary unit, caused for example by a foreign object placed in the vicinity of the primary unit. The secondary device 30 in this case is assumed to be carried in or by a host object such as a portable electrical or electronic device. As explained hereinbefore the secondary device and/or host object also inevitably impose a "friendly" parasitic load 501 on the primary unit.

As described earlier with reference to FIG. 1, the primary unit 10 comprises a primary coil 12, an electrical drive unit 14, a control unit 16 and a decay measurement unit 18.

The electrical drive unit 14 in this embodiment has a conventional half bridge configuration in which a first switch 20 is connected between a first power supply line of the primary unit and an output node of the electrical drive unit, and a second switch 21 is connected between the output node and a second power supply line of the primary unit. The first and second switches 20 and 21 may, for example, be field-effect transistors (FETs). The electrical drive unit 14 also comprises a drive controller 19 which applies control signals to the switches 21 and 22 to turn them on and off. The drive controller 19 has a control input connected to an output of the control unit 16

The output node of the electrical drive unit 14 is connected via a capacitor 17 to one side of the primary coil 12.

The control unit 16 is a microprocessor in this embodiment. Alternatively, an ASIC could be used to implement the control unit 16, as well as some or all of the other circuit elements of the primary unit.

The decay measurement unit 18 in this embodiment comprises a resistor 25 which has a first node connected to one side of a switch 28 and a second node connected to the second power supply line. The resistor 25 is a low-value resistor. The decay measurement unit 18 further comprises an operational amplifier 26 having an input connected to the first node of the resistor 25. The decay measurement unit 18 also comprises an analog-to-digital converter (ADC) 27 connected to an output of the operational amplifier 26. An output of the ADC 27 is connected to a measurement input of the control unit 16.

The other side of the switch 28 is connected to the other side of the primary coil 12. A snubber unit 22 is connected in parallel with the switch 28. The snubber unit 22 comprises a capacitor 23 and a resistor 24 connected in series with one another.

The primary unit 10 further comprises a calibration unit 29 in this embodiment. The calibration unit 29 stores first compensation information about the losses in the primary unit (e.g. electrical or magnetic losses). By design, at manufacture, and/or periodically thereafter, the losses in the primary unit may be calibrated and stored within the calibration unit 29. The calibration unit supplies the stored information to the control unit 16 to enable the control unit 16 to subtract the losses from the total measurement, thus calculating a number for the loss due to parasitic loads alone. This calibration unit 29 may vary the first compensation information to cope with variable losses in the primary unit, for example losses which vary with temperature.

The secondary device 30 comprises a secondary coil 32, a rectifier 34, a secondary control unit 36, a dummy load switch 38, a dummy load 40, a load switch 42, a storage unit 44 and an actual load 46. The dummy load switch 38 and the load switch 42 may each be an FET, for example. The dummy load 40 is, for example, a resistor. The storage unit 44 is a capacitor in this embodiment but an inductor could be used instead. The actual load 46 is external to the secondary device in this embodiment and is part of the host object. It could be a battery charge controller for a Lithium-ion cell.

Operation of the system of FIG. 4 will now be described.

In an "operating mode" of the system, the host object incorporating the secondary device 30 is placed on or in proximity to the primary unit 10. The drive controller 19 applies control signals to the switches 20 and 21 alternately, so that electrical drive signals are applied to the primary coil 12 via the capacitor 17. The switch 28 is closed. The primary coil 12, capacitor 17, switch 28 and resistor 25 and parts of the secondary device 30 together form a resonant tank. The resonant tank is preferably driven by the electrical drive unit 14 at or near resonance so as to maximise power transfer to the secondary device, but this is not essential in the present invention. In its driven condition, the resonant tank could be driven at some frequency other than its resonant frequency.

In the operating mode, the primary coil 12 generates an electromagnetic field in the vicinity of the primary unit. The secondary coil 32 couples with this field and an alternating current is induced in the coil by the field. The dummy load switch 38 is open and the load switch 42 is closed. The alternating current induced in the secondary coil 32 is rectified by the rectifier 34 and the rectified current is supplied via the load switch 42 to the storage unit 44 and the actual load 46. In this way, power is transferred inductively from the primary unit to the secondary device 30 and from there to the load. The storage unit 44 stores energy in the operating mode.

Figure 5:
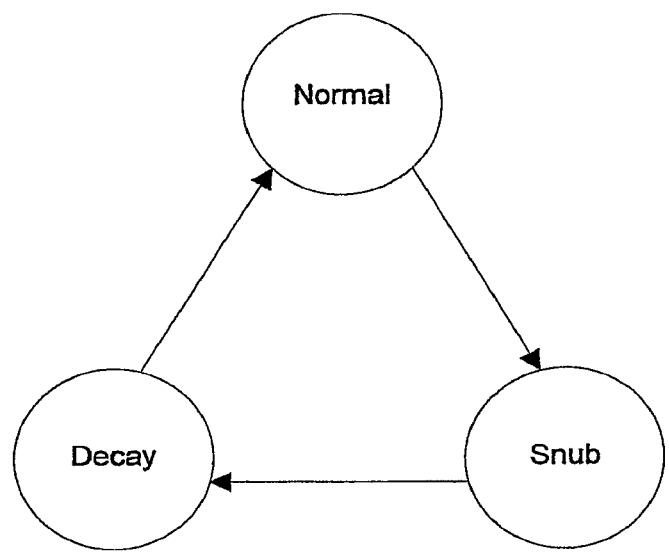
FIG. 5 shows different operating states of a circuit in the FIG. 4 system when the circuit is in an undriven resonating condition.
Figure 7:
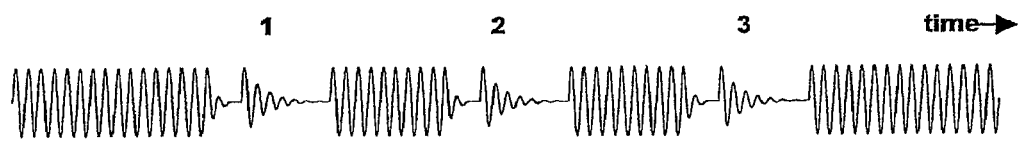
FIG. 7 is a diagram illustrating waveforms generated in operation of the FIG. 4 system.

Whilst in the operating mode, from time to time the control unit 16 in the primary unit initiates a series of three ring-downs in quick succession. Such a series of three ring-downs is shown in FIG. 7. The interval between successive series of ring-downs may be, for example, one second. The duration of each ring-down is, for example, one millisecond. Each ring-down of a series has a sequence of three states as shown in FIG. 5.

Initially, the system has a normal state in which the control unit 16 causes the electrical drive unit 14 to apply drive signals to the primary coil 12 to cause it to oscillate. It will be appreciated that in the operating mode as described above, the system is in this state for almost all the time.

The next state is a "snub" state. The application of drive signals to the primary coil 12 by the electrical drive unit 14 is suspended under the control of the control unit 16. The drive controller 19 closes the switch 21. The control unit 16 also opens the switch 28 at a time when most of the energy in the resonant tank resides in the capacitor 17. The opening of the switch 28 brings the snubber unit 22 in series with the resonant tank. The snubber unit 22 quickly dissipates any energy which remains in the primary coil 12, stopping it from resonating within one cycle or so. Most of the energy stored in the resonant tank is left in the capacitor 17.

The sudden cessation of cycles is detected by the secondary control unit 36 in the secondary device 30. The secondary control unit 36 opens the load switch 42. The system then enters the decay state from the snub state.

The control unit 16 closes the switch 28, removing the snubber unit 22 from the resonant tank, and thus allowing the energy in capacitor 17 to flow again within the resonant tank. In the decay state, the resonant tank operates in an undriven resonating condition. Energy stored in the resonant tank decays over the course of time in the decay state. In this embodiment, the decay measurement unit 18 measures the energy decay in the resonant tank by measuring the current flowing through the primary coil 12. The same current flows through the resistor 25 and generates a voltage at the first node of that resistor. This voltage is buffered by the operational amplifier 26 and converted into a digital signal by the ADC 27. The resulting digital signal is applied to the measurement input of the control unit 16.

Figure 3:
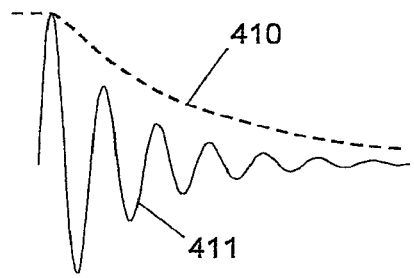
FIG. 3 is a graph illustrating how energy decays in different parts of the system of FIG. 1.

The secondary device uses the storage unit 44 to store energy from the primary unit during normal operation. During the decay state, the energy stored in the storage unit 44 of the secondary device gradually decays as energy is delivered to the load. Provided that the storage unit has sufficient capacity, and is sufficiently well-charged before ring-down commences, the storage unit can deliver continuous power to the secondary device load throughout the ring-down, so the actual load 46 is not interrupted. In FIG. 3 a solid line 411 shows the decay of energy in the primary coil 12 and a dotted line 410 represents the decay of energy in the storage unit 44 of the secondary device during the decay state.

The secondary device load will not take any power from the primary coil, and will thus be "invisible" to the primary unit, during the decay state. This is possible in this embodiment because the rectifier 34 between the secondary coil and the storage unit allows current to flow only from the former to the latter. It can be arranged in other ways that the secondary device load will not take any power from the primary coil during the ring-down.

As long as this is the case, the decay measurement will not include losses due to power supplied to the secondary load, i.e. will only measure losses in the primary unit and losses due to parasitic loads.

Figure 6:
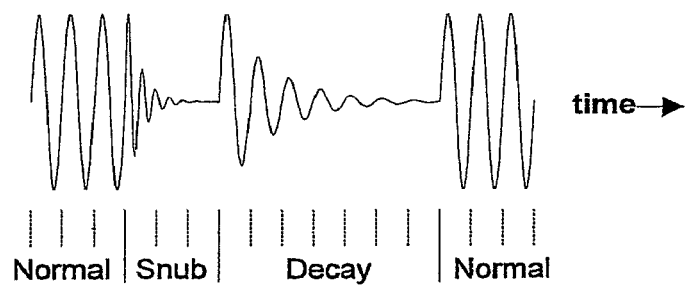
FIG. 6 is a graph illustrating a variation over time of current flowing through a primary coil in each of the FIG. 5 states.

FIG. 6 shows how the current flowing through the primary coil 12 varies in the normal, snub and decay states which occur during a ring-down. In this embodiment, the digital signals representing the current flowing in the primary coil within a measurement period are received and processed within the control unit 16 to calculate a measure of the rate of energy decay in the resonant tank.

An equation describing the energy stored in the resonant tank, at resonance, is:

$$E = \frac{1}{2}L\hat{I}^2 = \frac{1}{2}C\hat{V}^2$$

where E is the energy, L the inductance, $\hat{I}$ is the peak current, C is the capacitance and $\hat{V}$ is the peak voltage.

Therefore the energy stored in the resonant tank of the primary at any given moment can be calculated if the inductance and peak current are known, or if the capacitance and peak voltage are known, or combinations thereof. Typically the capacitance is known by design, the peak current and voltage can be measured by suitable circuitry, and the inductance can be deduced by observing the natural resonant frequency during ring-down and applying the formula:

$$L = \frac{1}{4\pi^2 f^2 C}$$

The rate of decay of energy (and thus the loss) from the resonant tank can be calculated by measuring $E_1$ at time $T_1$ and $E_2$ at another time $T_2$, and calculating $$\frac{E_2 - E_1}{T_2 - T_1}$$

Since at resonance the voltage and current in the resonant tank will be 90 degrees out of phase with one another, a convenient method of reading the peak voltage of one is to trigger the measurement on the zero-crossing of the other.

The control unit 16 employs the first compensation information stored in the calibration unit 29 when processing the digital signals to measure the energy decay rate. In this way, the control unit 16 compensates for the losses arising in the primary unit itself.

The behaviour of the primary unit and the secondary device is slightly different in each of the three ring-downs of a series.

During the first ring-down, the secondary control unit 36 has the dummy load switch 38 open so that the dummy load 40 is not connected to the secondary coil 32. As a result, the energy decay measure produced during the first ring-down is a measure of the energy decay due to any parasitic loads 500 from foreign objects in the vicinity of the primary unit and any parasitic load 501 imposed by losses in the secondary device and/or its host object.

During the second ring-down, the secondary control unit 36 selectively closes the dummy load switch 38. The secondary control unit 36 decides whether to have the dummy load switch 38 open or closed during the second ring-down based on the power requirement of the actual load 46. If the load 46 does not require any power at the present time, for example, because it has a rechargeable battery which is presently fully charged, then the dummy load switch 38 is kept open during the second ring-down. If, on the other hand, the load 46 does require power at the present time, then the dummy load switch 38 is closed so that the dummy load 40 is connected to the primary coil 32.

The control unit 16 produces another measure of the energy decay rate during a measurement period within the second ring-down. If the energy decay rate during the second ring-down is substantially different from the energy decay rate during the first ring-down, the control unit 16 detects that a secondary device requiring power may be present in the vicinity of the primary unit.

During the third ring-down, the secondary control unit 36 always closes the dummy load switch 38 so that the dummy load 40 is connected to the secondary coil 32. Another measure of the energy decay rate is taken by the control unit 16 in the primary unit. In this case, the energy decay rate is a measure of the sum of the parasitic loads 500, the parasitic load 501 of the secondary device and/or host object, and the dummy load 40. Based on the difference between the energy decay rates in the first and third ring-downs, the control unit calculates the value of the total of the dummy loads 40 in all of the secondary devices present in the vicinity of the primary unit.

Each dummy load 40 in a secondary device 30 in the system of this embodiment is set to a particular value (at manufacture or during calibration or testing) so that the value represents the parasitic load 501 imposed by the secondary device concerned and/or by its host object.

Thus, the total dummy load for all secondary devices present, as calculated by the control unit 16, can be used by the control unit 16 as second compensation information to compensate for the parasitic loads 501 of the secondary devices present. For example, if the control unit 16 detects that a substantial parasitic load 500 is present in the vicinity of the primary unit when the energy decay rate exceeds some threshold, the threshold may be increased by an amount dependent on the total parasitic load 501 of all the secondary devices present, so that the detection of parasitic loads 500 from foreign objects is not influenced by the number of secondary devices present.

A system embodying the present invention is capable of measuring loads imposed on the primary unit sensitively, for example to within 50 mW or so. With this degree of sensitivity, it is possible to ensure that very little power is coupled into parasitic loads 500 such as foreign objects.

Figure 8:
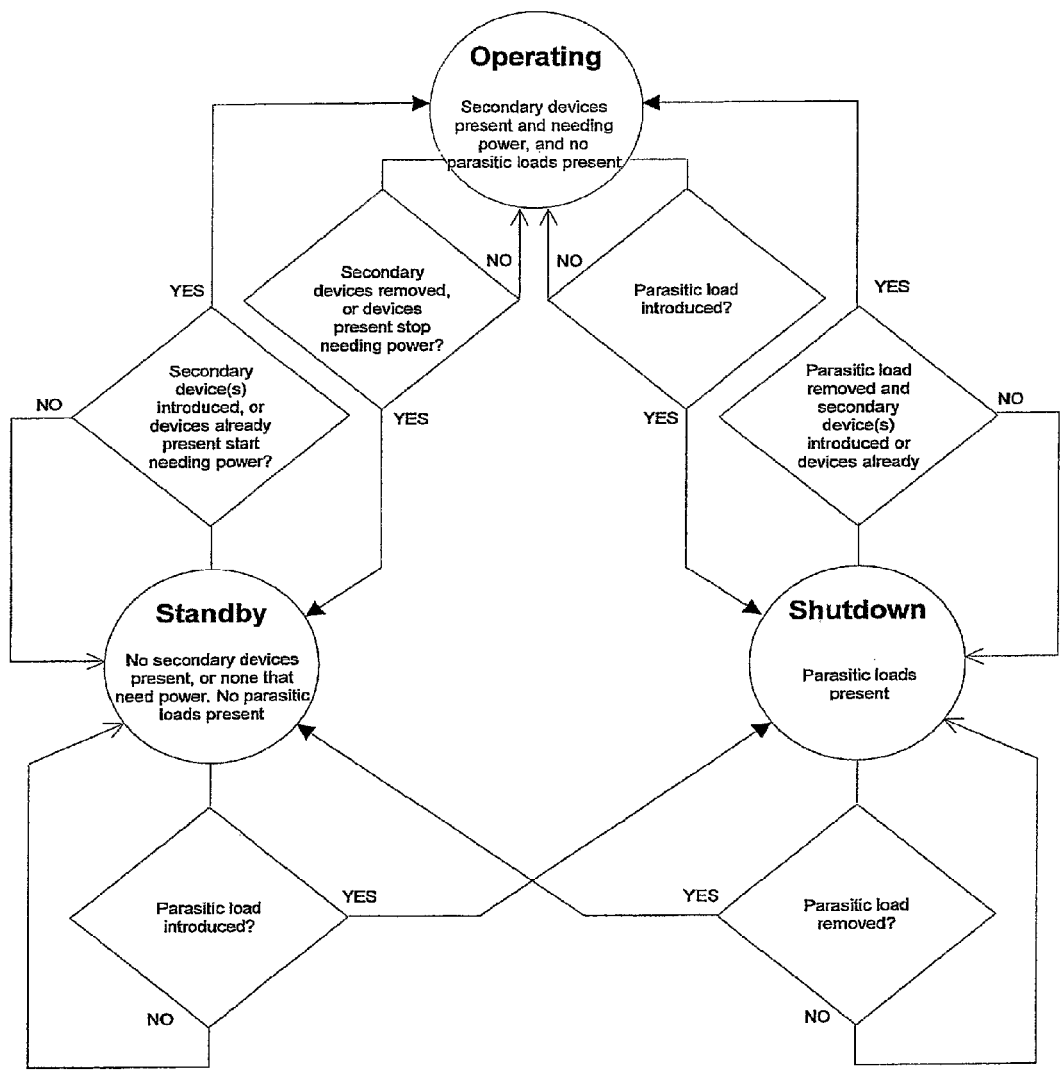
FIG. 8 is a diagram for illustrating different modes of operation in the FIG. 4 system.

FIG. 8 is a diagram illustrating the different modes of operation in the FIG. 4 system and the conditions for switching between these different modes. The three modes of operation are an operating mode, a shutdown mode and a standby mode.

In the operating mode, the primary unit is in the normal state (driven condition) most of the time, but periodically does a series of three ring-downs as described above. If the result of the ring-downs is that no secondary device requires power, the primary unit goes into a standby mode. If the result of the ring-downs is that a significant parasitic load 500 is present, the primary unit goes into a shutdown mode.

In the standby mode, the electrical drive unit 14 is stopped for most of the time, thus consuming little power. Periodically the primary unit enters the normal state then does a series of ring-downs in respective probing periods, to check whether it should enter either the operating mode or the shutdown mode. Otherwise it remains in the standby mode.

The shutdown mode is functionally identical to standby mode. However, the two modes may be distinguished by some user-interface feature such as an LED to prompt the user to remove any substantial parasitic load 500.

Figure 9:
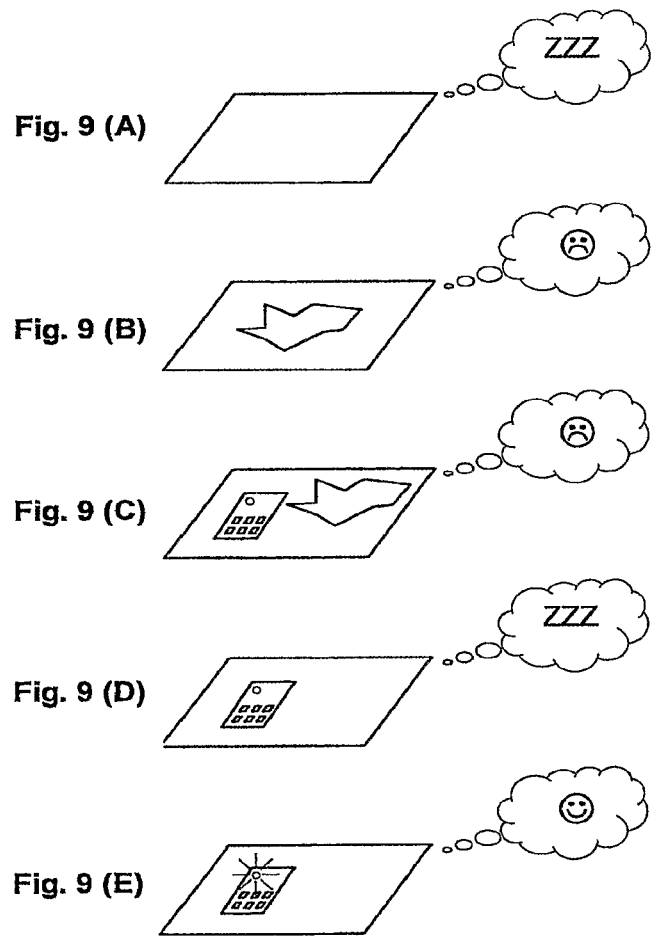
FIGS. 9(A) to (E) illustrate the conditions under which the modes of FIG. 8 are selected in the FIG. 4 system.

FIGS. 9(A) to 9(E) illustrate the conditions under which the modes of FIG. 8 are selected in the FIG. 4 system. In FIG. 9(A) there is no secondary device present in the vicinity of the primary unit. In this case, the primary unit is in the standby mode. In FIG. 9(B) no secondary device is present but a substantial parasitic load is present in the vicinity of the primary unit. In this case, the primary unit is in the shutdown mode. In FIG. 9(C) a secondary device and a substantial parasitic load are both present at the same time in the vicinity of the primary unit. In this case, the primary unit is in the shutdown mode. In FIG. 9(D) a secondary device is present in the vicinity of the primary unit, but the load connected to the secondary device does not need any power at the current time. In this case, the primary unit is in the standby mode. Finally, in FIG. 9(E) a secondary device is present and its load needs power to charge or operate. Thus, the primary unit is in the operating mode.

The invention claimed is:

1. A portable device separable from a primary unit, said portable device comprising:
   a secondary adapted to couple with a field generated by a primary unit such that power is received inductively from the primary unit without direct electrical conductive contacts;
   a load capable of receiving power from said secondary;
   a load connection unit operably coupled to said secondary and said load of said portable device, said load connection unit capable of selectively connecting said load and said secondary, wherein said load connection unit, in a connected state, enables said secondary to provide power to said load, wherein said load connection unit, in a disconnected state, isolates said load from said secondary; and
   a communication unit operable to receive communication from the primary unit, wherein, based on communication from the primary unit, said load connection unit isolates said load from said secondary.

2. The portable device of claim 1 wherein based on said communication from the primary unit being indicative of the primary unit operating to determine presence of a parasitic load, said load connection unit isolates said load from said secondary.

3. The portable device of claim 1 wherein based on said communication from the primary unit being a synchronization signal, said load connection unit isolates said load from said secondary.

4. The portable device of claim 3 wherein said synchronization signal enables said portable device to isolate said load from said secondary while the primary unit conducts a ring-down to detect presence of a parasitic load.

5. The portable device of claim 1 wherein said communication unit is operable to communicate information to the primary unit by imposing a communication load of said portable device on the primary unit.

6. The portable device of claim 5 wherein said information relates to a friendly parasitic load imposed by said portable device on the primary unit.

7. The portable device of claim 6 wherein said communication load is a dummy load, wherein said dummy load has a resistance value selected to communicate said friendly parasitic load of said portable device.

8. A method of controlling inductive power transfer in an inductive power transfer system comprising a primary unit having a primary and electrical drive circuitry connected to the primary for applying electrical drive signals thereto so as to generate an electromagnetic field, the system including at least one portable device separable from the primary unit and having a secondary adapted to couple with the primary to receive power inductively without direct electrical conductive contacts, said method comprising:
   transferring power inductively from the primary unit to the at least one portable device;
   providing inductively received power from the secondary to a load of the at least one portable device, wherein the at least one portable device is capable of selectively connecting the secondary to the load;
   receiving communication from the primary unit;
   based on communication from the primary unit, isolating the load from the secondary; and
   operating the primary unit to determine presence of a parasitic load in proximity to the primary unit.

9. The method of claim 8 further comprising:
   obtaining, in a probing period, one or more measurements in the primary unit, wherein, in the probing period, the load is isolated from the secondary; and
   determining, based on the one or more measurements, presence of a parasitic load in proximity to the primary unit.

10. The method of claim 9 wherein the probing period is a ring-down period in which the primary is substantially undriven.

11. The method of claim 10 wherein based on communication being indicative of the primary unit operating to determine presence of a parasitic load, the load is isolated from the secondary.

12. The method of claim 11 wherein the communication being indicative of the primary unit operated to determine presence of a parasitic load is a synchronization signal.

13. The method of claim 12 further comprising, following the synchronization signal, conducting the probing period in which the primary is substantially undriven.

14. The method of claim 8 further comprising communicating to the primary unit information indicative of a friendly parasitic load of the secondary device.

15. An inductive power transfer system including a primary unit having a primary and electrical drive circuitry connected to the primary for applying electrical drive signals thereto so as to generate an electromagnetic field, the system also including at least one portable device separable from the primary unit and having a secondary adapted to couple with the primary to receive power inductively without direct electrical conductive contacts, the inductive power transfer system comprising:
   a control unit operable to control the electrical drive circuitry to control application of the electrical drive signals to the primary; and a measurement unit operable to take a first measurement in a first measurement period and a second measurement in a second measurement period, wherein a first load of the portable device is imposed on the primary unit in the first measurement period, and wherein a second load of the portable device is imposed on the primary unit in the second measurement period;

wherein the control unit is operable, in dependence upon the first measurement and the second measurement, to detect presence of a parasitic load in proximity to the primary.

16. The inductive power transfer system of claim 15 wherein based on at least one of the first measurement and the second measurement exceeding a threshold, the control unit detects presence of a parasitic load.

17. The inductive power transfer system of claim 16 wherein the first measurement and the second measurement are energy decay rates, and wherein the first measurement period and the second measurement period are ring-down periods in which the primary is substantially undriven.

18. The inductive power transfer system of claim 15 wherein based on the first measurement and the second measurement, the control unit determines a friendly parasitic load of the portable device.

19. The inductive power transfer system of claim 18 wherein the control unit increases a threshold for detecting presence of a parasitic load based on the friendly parasitic load.

20. The inductive power transfer system of claim 15 wherein at least one of the first load and the second load is representative of a friendly parasitic load of the portable device.

21. The inductive power transfer system of claim 15 wherein the first load and the second load are dummy loads.

22. The inductive power transfer system of claim 15 wherein one of the first load and the second load is zero.

* * * * *